US012810461B2

(12) United States Patent
Zhang et al.

(10) Patent No.: US 12,810,461 B2
(45) Date of Patent: Nov. 24, 2026

(54) CAMERA POSE FOR MOVING VEHICLE

(71) Applicants: Ford Global Technologies, LLC, Dearborn, MI (US); AUSTRALIAN NATIONAL UNIVERSITY, Acton (AU)

(72) Inventors: Yanhao Zhang, Aranda (AU); Yujiao Shi, Canberra (AU); Shan Wang, Lawson (AU); Ankit Girish Vora, Northville, MI (US); Akhil Perincherry, Dearborn, MI (US); Yongbo Chen, Harrison (AU); Hongdong Li, Lyneham (AU)

(73) Assignee: Ford Global Technologies, LLC, Dearborn, MI (US)

( * ) Notice: Subject to any disclaimer, the term of this patent is extended or adjusted under 35 U.S.C. 154(b) by 289 days.

(21) Appl. No.: 18/625,506

(22) Filed: Apr. 3, 2024

(65) Prior Publication Data

US 2025/0315969 A1 Oct. 9, 2025

(51) Int. Cl.
*G06T 7/70* (2017.01)
*G06T 7/11* (2017.01)
(Continued)

(52) U.S. Cl.
CPC .................. *G06T 7/70* (2017.01); *G06T 7/11* (2017.01); *G06T 7/579* (2017.01); *G06T 7/80* (2017.01);
(Continued)

(58) Field of Classification Search
None
See application file for complete search history.

(56) References Cited

U.S. PATENT DOCUMENTS 10,962,371 B2 3/2021 Bush et al.
2016/0154408 A1* 6/2016 Eade ...................... G06F 16/24 701/523

(Continued)

FOREIGN PATENT DOCUMENTS

CN 109507677 B 8/2020
CN 11469229 A 7/2022

OTHER PUBLICATIONS

Shi et al ("Beyond cross-view image retrieval: Highly accurate vehicle localization using satellite image." Proceedings of the IEEE/CVF Conference on Computer Vision and Pattern Recognition. 2022, pp. 17010-17020) (Year: 2022).*

(Continued)

*Primary Examiner* — Leon Viet Q Nguyen
(74) *Attorney, Agent, or Firm* — Frank A. MacKenzie; Brooks Kushman P.C.

(57) ABSTRACT

A computer includes a processor and a memory, and the memory stores instructions executable by the processor to determine a first set of SLAM poses of a camera with respect to an environment by performing a simultaneous localization and mapping (SLAM) algorithm, determine a second set of G2O poses of the camera based on a plurality of ground-view images from the camera and an overhead image depicting the environment, and determine a third set of final poses of the camera by minimizing a loss function derived from a pose graph of the final poses. The loss function is based on the SLAM poses in the first set and the G2O poses in the second set.

20 Claims, 4 Drawing Sheets

(51) Int. Cl.

| | |
|---|---|
| ***G06T 7/579*** | (2017.01) |
| ***G06T 7/80*** | (2017.01) |
| ***G06T 11/26*** | (2026.01) |
| ***G06V 10/776*** | (2022.01) |
| ***G06V 20/50*** | (2022.01) |

(52) U.S. Cl.

CPC ............ *G06T 11/26* (2026.01); *G06V 10/776* (2022.01); *G06V 20/50* (2022.01); *G06T 2207/30244* (2013.01); *G06T 2207/30252* (2013.01)

(56) References Cited

U.S. PATENT DOCUMENTS

| | | | | |
|---|---|---|---|---|
| 2016/0327653 | A1 | 11/2016 | Humphreys et al. | |
| 2021/0142077 | A1 | 5/2021 | Cox et al. | |
| 2023/0121534 | A1* | 4/2023 | Rukhovich | G06T 7/70 382/103 |
| 2024/0094009 | A1* | 3/2024 | Bosse | G06T 7/248 |
| 2025/0014200 | A1* | 1/2025 | Ahmed | G06V 20/56 |
| 2025/0086984 | A1* | 3/2025 | Ozog | G06V 20/582 |

OTHER PUBLICATIONS

Mur-Artal et al ("Orb-slam2: An Open-Source SLAM System for Monocular, Stereo, and RGB-D Cameras." IEEE transactions on robotics 33.5, 2017, pp. 1255-1262) (Year: 2017).*

Carlson, J., "Mapping Large, Urban Environments With GPS-Aided SLAM," The Robotics Institute Carnegie Mellon University, Pittsburgh, Pennsylvania, 2010, 107 pages.

Campos, C., et al., "ORB-SLAM3: An Accurate Open-Source Library for Visual, Visual-Inertial and Multi-Map SLAM," arXiv:2007.11898v2 [cs. RO] Apr. 23, 2021, 18 pages.

Zhang, X., et al., "Retracted: Combined GNSS/SLAM-Based High Accuracy Indoor Dynamic Target Localization Method," Wireless Communications and Mobile Computing, Aug. 2, 2023, 1 page.

* cited by examiner

CAMERA POSE FOR MOVING VEHICLE

BACKGROUND

Advanced driver assistance systems (ADAS) are electronic technologies that assist drivers in driving and parking functions. Examples of ADAS include forward proximity detection, lane-departure detection, blind-spot detection, braking actuation, adaptive cruise control, and lane-keeping assistance systems.

DETAILED DESCRIPTION

Figure 1:
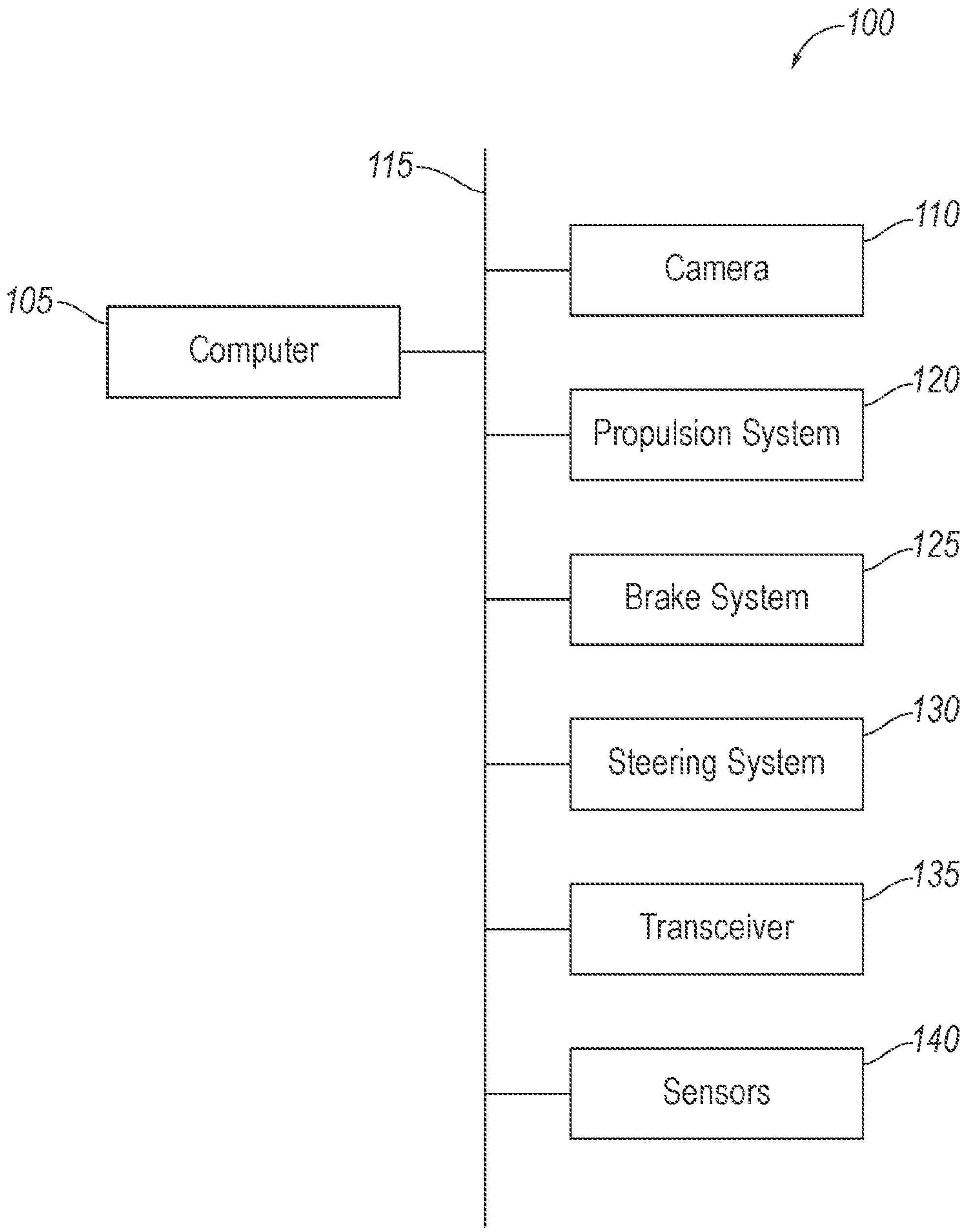
FIG. 1 is a block diagram of an example vehicle including a camera.

This disclosure provides techniques for determining a series of poses of a camera in an environment, e.g., a camera mounted on a vehicle as the vehicle operates in the environment. The techniques use a simultaneous localization and mapping (SLAM) algorithm to determine SLAM poses of the camera and an algorithm for comparing ground-view images with an overhead image to determine ground-to-overhead (G2O) poses of the camera. The techniques can provide high accuracy compared to either of the algorithms. The G2O poses can minimize long-term drift, i.e., poses becoming less accurate over time, by the SLAM algorithm. The SLAM poses can provide a correction if the G2O algorithm returns an incorrect local optimum. A computer can be programmed to determine the SLAM poses, determine the G2O poses, and determine final poses of the camera by minimizing a loss function derived from a pose graph of the final poses. The loss function is based on the SLAM poses and the G2O poses. The final poses may be used to, e.g., operate the vehicle in the environment.

A computer includes a processor and a memory, and the memory stores instructions executable by the processor to determine a first set of SLAM poses of a camera with respect to an environment by performing a simultaneous localization and mapping (SLAM) algorithm, determine a second set of G2O poses of the camera based on a plurality of ground-view images from the camera and an overhead image depicting the environment, and determine a third set of final poses of the camera by minimizing a loss function derived from a pose graph of the final poses. The loss function is based on the SLAM poses in the first set and the G2O poses in the second set.

In an example, the instructions may further include instructions to actuate a component of a vehicle including the camera based on the final poses.

In an example, the instructions may further include instructions to, before determining the third set of the final poses, remove a first G2O pose from the second set upon determining that the first G2O pose is outside a spatial bound. In a further example, the instructions may further include instructions to determine the spatial bound based on the first set of the SLAM poses.

In another further example, the instructions may further include instructions to determine the spatial bound based on an uncertainty measure of the first set of the SLAM poses.

In an example, the first set may include a first SLAM pose at a first timestep and a second SLAM pose at a second timestep immediately following the first timestep; the second set may include a first G2O pose at the first timestep and a second G2O pose at the second timestep; and the instructions may further include instructions to, before determining the third set of the final poses, remove the second G2O pose from the second set based on a comparison of a first change from the first SLAM pose to the second SLAM pose and a second change from the first G2O pose to the second G2O pose. In a further example, the first change and the second change may be rotations.

In another further example, the first change and the second change may be translations.

In another further example, the instructions may further include instructions to remove the second G2O pose from the second set in response to the comparison exceeding a threshold.

In an example, the pose graph may include the final poses as graph nodes and a plurality of error terms as graph edges, and the loss function may include the error terms. In a further example, the error terms may include at least one term penalizing deviation between the final poses in the third set and the SLAM poses in the first set. In a yet further example, the error terms may include separate terms penalizing rotational deviation between the final poses in the third set and the SLAM poses in the first set and penalizing translational deviation between the final poses in the third set and the SLAM poses in the first set.

In another further example, the error terms may include at least one term penalizing deviation between the final poses in the third set and the G2O poses in the second set. In a yet further example, the error terms may include separate terms penalizing rotational deviation between the final poses in the third set and the G2O poses in the second set and penalizing translational deviation between the final poses in the third set and the G2O poses in the second set.

In an example, the SLAM poses, the G2O poses, and the final poses may each include two spatial dimensions and one angular dimension.

A method includes determining a first set of SLAM poses of a camera with respect to an environment by performing a simultaneous localization and mapping (SLAM) algorithm, determining a second set of G2O poses of the camera based on a plurality of ground-view images from the camera and an overhead image depicting the environment, and determining a third set of final poses of the camera by minimizing a loss function derived from a pose graph of the final poses. The loss function is based on the SLAM poses in the first set and the G2O poses in the second set.

In an example, the method may further include actuating a component of a vehicle including the camera based on the final poses.

In an example, the method may further include, before determining the third set of the final poses, removing a first G2O pose from the second set upon determining that the first G2O pose is outside a spatial bound.

In an example, the first set may include a first SLAM pose at a first timestep and a second SLAM pose at a second timestep immediately following the first timestep; the second set may include a first G2O pose at the first timestep and a second G2O pose at the second timestep; and the method may further include, before determining the third set of the final poses, removing the second G2O pose from the second set based on a comparison of a first change from the first SLAM pose to the second SLAM pose and a second change from the first G2O pose to the second G2O pose.

In an example, the pose graph may include the final poses as graph nodes and a plurality of error terms as graph edges, and the loss function may include the error terms.

With reference to the Figures, wherein like numerals indicate like parts throughout the several views, a computer 105 includes a processor and a memory, and the memory stores instructions executable by the processor to determine a first set of SLAM poses 205 of a camera 110 with respect to an environment by performing a simultaneous localization and mapping (SLAM) algorithm, determine a second set of G2O poses 210 of the camera 110 based on a plurality of ground-view images from the camera 110 and an overhead image depicting the environment, and determine a third set of final poses 405 of the camera 110 by minimizing a loss function derived from a pose graph 400 of the final poses 405. The loss function is based on the SLAM poses 205 in the first set and the G2O poses 210 in the second set.

With reference to FIG. 1, the vehicle 100 may be any passenger or commercial automobile such as a car, a truck, a sport utility vehicle, a crossover, a van, a minivan, a taxi, a bus, etc. The vehicle 100 may include the computer 105, a communications network 115, the camera 110, a propulsion system 120, a brake system 125, a steering system 130, a transceiver 135, and other sensors 140.

The computer 105 is a microprocessor-based computing device, e.g., a generic computing device including a processor and a memory, an electronic controller or the like, a field-programmable gate array (FPGA), an application-specific integrated circuit (ASIC), a combination of the foregoing, etc. Typically, a hardware description language such as VHDL (VHSIC (Very High Speed Integrated Circuit) Hardware Description Language) is used in electronic design automation to describe digital and mixed-signal systems such as FPGA and ASIC. For example, an ASIC is manufactured based on VHDL programming provided pre-manufacturing, whereas logical components inside an FPGA may be configured based on VHDL programming, e.g., stored in a memory electrically connected to the FPGA circuit. The computer 105 can thus include a processor, a memory, etc. The memory of the computer 105 can include media for storing instructions executable by the processor as well as for electronically storing data and/or databases, and/or the computer 105 can include structures such as the foregoing by which programming is provided. The computer 105 can be multiple computers coupled together.

The computer 105 may transmit and receive data through the communications network 115. The communications network 115 may be, e.g., a controller area network (CAN) bus, Ethernet, WiFi, Local Interconnect Network (LIN), onboard diagnostics connector (OBD-II), and/or any other wired or wireless communications network. The computer 105 may be communicatively coupled to the camera 110, the propulsion system 120, the brake system 125, the steering system 130, the transceiver 135, the sensors 140, and other components via the communications network 115.

The camera 110 can detect electromagnetic radiation in some range of wavelengths. For example, the camera 110 may detect visible light, infrared radiation, ultraviolet light, or some range of wavelengths including visible, infrared, and/or ultraviolet light. For example, the camera 110 can be a charge-coupled device (CCD), complementary metal oxide semiconductor (CMOS), or any other suitable type. The camera 110 may be fixed relative to the vehicle 100, e.g., fixedly mounted to a body of the vehicle 100. The camera 110 is oriented at least partially horizontally, e.g., may have a tilt angle and a roll angle relative to the vehicle 100 that are close to zero. For example, a center of a field of view of the camera 110 may be closer to horizontal than to vertical, e.g., may be tilted slightly downward from horizontal.

The propulsion system 120 of the vehicle 100 generates energy and translates the energy into motion of the vehicle 100. The propulsion system 120 may be a conventional vehicle propulsion subsystem, for example, a conventional powertrain including an internal-combustion engine coupled to a transmission that transfers rotational motion to wheels; an electric powertrain including batteries, an electric motor, and a transmission that transfers rotational motion to the wheels; a hybrid powertrain including elements of the conventional powertrain and the electric powertrain; or any other type of propulsion. The propulsion system 120 can include an electronic control unit (ECU) or the like that is in communication with and receives input from the computer 105 and/or a human operator. The human operator may control the propulsion system 120 via, e.g., an accelerator pedal and/or a gear-shift lever.

The brake system 125 is typically a conventional vehicle braking subsystem and resists the motion of the vehicle 100 to thereby slow and/or stop the vehicle 100. The brake system 125 may include friction brakes such as disc brakes, drum brakes, band brakes, etc.; regenerative brakes; any other suitable type of brakes; or a combination. The brake system 125 can include an ECU or the like that is in communication with and receives input from the computer 105 and/or a human operator. The human operator may control the brake system 125 via, e.g., a brake pedal.

The steering system 130 is typically a conventional vehicle steering subsystem and controls the turning of the wheels. The steering system 130 may be a rack-and-pinion system with electric power-assisted steering, a steer-by-wire system, as both are known, or any other suitable system. The steering system 130 can include an ECU or the like that is in communication with and receives input from the computer 105 and/or a human operator. The human operator may control the steering system 130 via, e.g., a steering wheel.

The transceiver 135 may be adapted to transmit signals wirelessly through any suitable wireless communication protocol, such as cellular, Bluetooth®, Bluetooth® Low Energy (BLE), ultra-wideband (UWB), WiFi, IEEE 802.11a/b/g/p, cellular-V2X (CV2X), Dedicated Short-Range Communications (DSRC), other RF (radio frequency) communications, etc. The transceiver 135 may be adapted to communicate with a remote server, that is, a server distinct and spaced from the vehicle 100. The remote server may be located outside the vehicle 100. For example, the remote server may be associated with another vehicle (e.g., V2V communications), an infrastructure component (e.g., V2I communications), an emergency responder, a mobile device associated with the owner of the vehicle 100, etc. The transceiver 135 may be one device or may include a separate transmitter and receiver.

The sensors 140 may provide data about operation of the vehicle 100, for example, wheel speed, wheel orientation, and engine and transmission data (e.g., temperature, fuel consumption, etc.). The sensors 140 may detect the location and/or orientation of the vehicle 100. For example, the sensors 140 may include global positioning system (GPS) sensors; accelerometers such as piezo-electric or microelectromechanical systems (MEMS); gyroscopes such as rate, ring laser, or fiber-optic gyroscopes; inertial measurements units (IMU); and magnetometers. The sensors 140 may detect the external world, e.g., objects and/or characteristics of surroundings of the vehicle 100, such as other vehicles, road lane markings, traffic lights and/or signs, road users, etc. For example, the sensors 140 may include radar sensors, ultrasonic sensors, scanning laser range finders, light detection and ranging (lidar) devices, and image processing sensors such as cameras.

The determination of the G2O poses 210 and thereby of the final poses 405 below is based on an overhead image. The overhead image is an image of the environment obtained by a sensor external to the vehicle 100, e.g., a camera above the ground. The sensor is unattached to the vehicle 100 and spaced from the vehicle 100. To capture the overhead image of the environment, the sensor, e.g., camera, may be mounted to a satellite, aircraft, helicopter, unmanned aerial vehicles (or drones), balloon, stand-alone pole, a ceiling of a building, etc. In particular, the overhead image may be a satellite image, i.e., an image captured from a sensor on board a satellite.

The overhead image is a two-dimensional matrix of pixels. Each pixel has a brightness or color represented as one or more numerical values, e.g., a scalar unitless value of photometric light intensity between 0 (black) and 1 (white), or values for each of red, green, and blue, e.g., each on an 8-bit scale (0 to 255) or a 12- or 16-bit scale. The pixels may be a mix of representations, e.g., a repeating pattern of scalar values of intensity for three pixels and a fourth pixel with three numerical color values, or some other pattern. Position in the overhead image, i.e., position in the field of view of the sensor at the time that the image frame was recorded, can be specified in pixel dimensions or coordinates, e.g., an ordered pair of pixel distances, such as a number of pixels from a top edge and a number of pixels from a left edge of the overhead image.

The computer 105 is programmed to receive the overhead image of the environment. For example, the computer 105 may receive the overhead image via the transceiver 135 from a remote server. For another example, the overhead image may be stored in the memory of the computer 105, and the computer 105 may receive the overhead image from the memory. The computer 105 may request the overhead image from the remote server or from memory based on a location of the vehicle 100, e.g., from a GPS sensor, in order that the overhead image covers the environment through which the vehicle 100 is traveling. The location of the vehicle 100 may be less accurate than the final poses 405 determined below.

The determination of the G2O poses 210 and thereby of the final poses 405 below is further based on the ground-view image. The computer 105 is programmed to receive the ground-view image, e.g., from the camera 110 over the communications network 115. The ground-view image is captured by the camera 110 within the environment, i.e., within the area represented in the overhead image. The camera 110 is oriented at least partially horizontally while capturing the ground-view image, e.g., by being fixed to the vehicle 100 in a partially horizontal orientation as described above. The ground-view image is a two-dimensional matrix of pixels, as described above for the overhead image, although the ground-view image may be a different pixel size than the overhead image.

Figure 2:
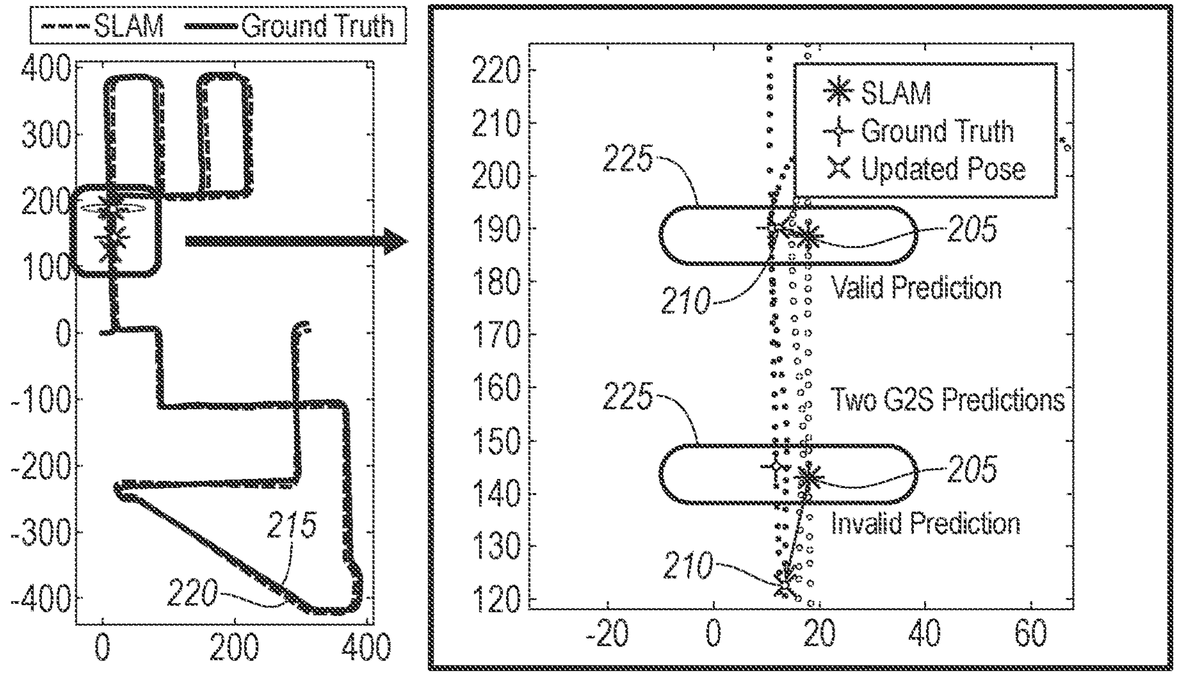
FIG. 2 is a plot of example estimated poses of the camera over time.
Figure 3:
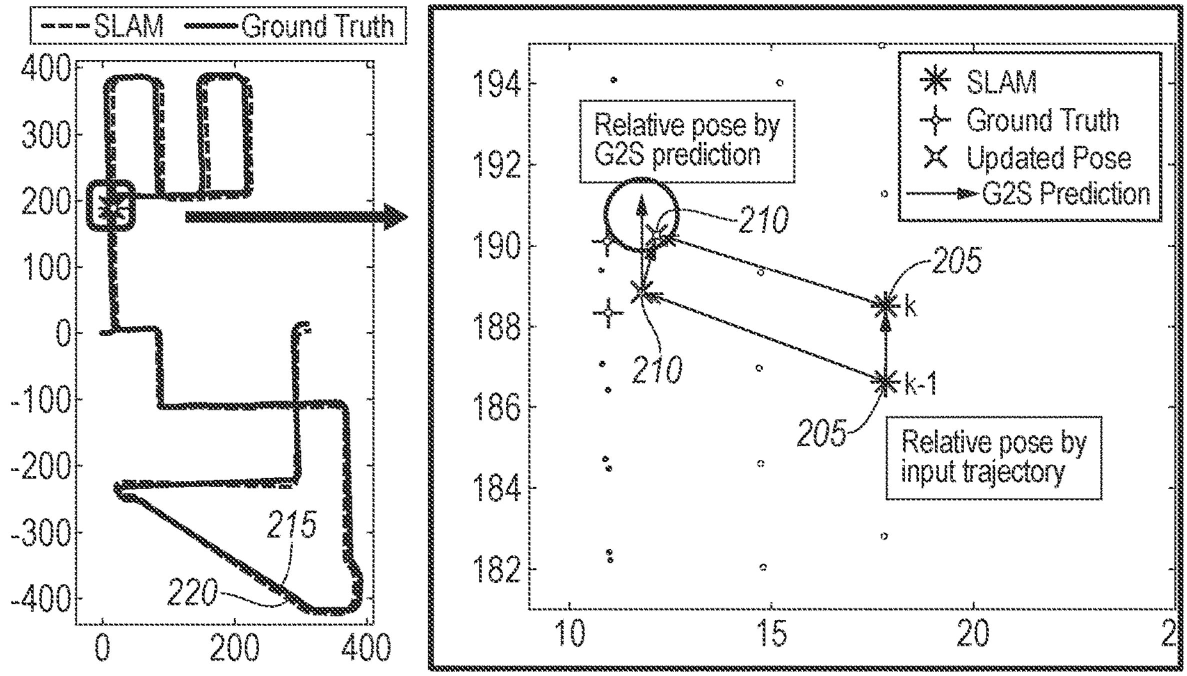
FIG. 3 is another plot of the estimated poses of the camera over time.

With reference to FIGS. 2-3, the first set of the SLAM poses 205 may include a sequence of SLAM poses 205 at a respective sequence of timesteps, e.g., a first SLAM pose 205 at a first timestep, a second SLAM pose 205 at a second timestep immediately following the first timestep, a third SLAM pose 205 at a third timestep immediately following the second timestep, and so on. The first set of the SLAM poses 205 may collectively define a first trajectory 215, e.g., a possible path that the vehicle 100 followed while traveling through the environment.

The SLAM poses 205 (as well as the G2O poses 210 and the final poses 405) may each include a location and an orientation, e.g., a two-dimensional horizontal location and a heading or yaw or azimuth angle. The poses 205, 210, 405 may each be represented as a vector of spatial and angular coordinates or equivalently with translation and rotation matrices. For example, the poses 205, 210, 405 may each include two spatial dimensions and one angular dimension.

The computer 105 is programmed to determine the first set of the SLAM poses 205 of the camera 110 with respect to the environment by performing a SLAM algorithm. As is known, SLAM is a process of generating and/or updating a map of an environment while simultaneously tracking an entity's location within the environment. The computer 105 may use any suitable SLAM or visual SLAM algorithm, e.g., particle filter, extended Kalman filter, covariance intersection, graphSLAM, etc., as are known. In particular, the computer 105 may use ORB-SLAM3, as described in Carlos Campos, Richard Elvira, Juan J. Gómez Rodríguez, José M. M. Montiel and Juan D. Tardós, "ORB-SLAM3: An Accurate Open-Source Library for Visual, Visual-Inertial and Multi-Map SLAM," *IEEE Transactions on Robotics* 37 (6): 1874-90, (December 2021).

The second set of the G2O poses 210 may include a sequence of G2O poses 210 at a respective sequence of timesteps, e.g., a first G2O pose 210 at a first timestep, a second G2O pose 210 at a second timestep immediately following the first timestep, a third G2O pose 210 at a third timestep immediately following the second timestep, and so on. The timesteps for the first set of the SLAM poses 205 and the second set of the G2O poses 210 may be the same; i.e., the first set of the SLAM poses 205 and the second set of the G2O poses 210 may be synchronized to the same set of timesteps. The second set of the SLAM poses 205 may collectively define a second trajectory 220, e.g., a possible path that the vehicle 100 followed while traveling through the environment.

The computer 105 is programmed to determine the second set of the G2O poses 210 of the camera 110 based on a plurality of ground-view images from the camera 110 and an overhead image depicting the environment. The computer 105 may determine each G2O pose 210 based on one of the ground-view images, e.g., the ground-view image returned by the camera 110 at the corresponding timestep, and on the overhead image. The computer 105 may determine each G2O pose 210 as described in U.S. patent application Ser. No. 18/190,194, hereby incorporated in its entirety. Alternatively, the computer 105 may perform a different algorithm for determining each G2O pose 210 based on the respective ground-view image and the overhead image, as is known in the art.

With reference to FIG. 2, the computer 105 may be programmed to determine at least one spatial bound 225. The spatial bounds 225 will be used to test the second set of G2O poses 210 for possible false positives (described below). The computer 105 determines the spatial bounds 225 based on the first set of the SLAM poses 205. For example, the computer 105 may determine each spatial bound 225 based on an uncertainty measure of the first set of the SLAM poses 205, e.g., a covariance of the first trajectory 215. The computer 105 may set each spatial bound 225 as a threshold value of the covariance, e.g., three standard deviations, from a respective SLAM pose 205. In other words, a G2O pose 210 that is within three standard deviations from the SLAM pose 205 of interest is within the spatial bound 225, and a G2O pose 210 that is more than three standard deviations from the SLAM pose 205 of interest is outside the spatial bound 225. The computer 105 may determine a spatial bound 225 independently for each SLAM pose 205. For example, the spatial bound 225 may be given by the following expression:

$$b_k(\alpha) = \frac{3}{n} \cdot \begin{bmatrix} \cos(\Theta(R_k)) & -\sin(\Theta(R_k)) \\ \sin(\Theta(R_k)) & \cos(\Theta(R_k)) \end{bmatrix} \cdot \Phi_k^{1/2} \cdot \begin{bmatrix} \cos(\alpha) \\ \sin(\alpha) \end{bmatrix}$$

in which k is an index of the timesteps, $b_k$ is the spatial bound 225 for the kth timestep, a is an azimuth angle varying from 0 to 2π radians around the SLAM pose 205, n is a scale factor, Θ( ) is a function returning the azimuth angle of a rotation matrix, $R_k$ is the rotation matrix of the kth SLAM pose 205, and $\Phi_k$ is a 2×2 matrix of the covariance of the x-y translation of the kth SLAM pose 205 (i.e., two-dimensional translation in the horizontal plane). The scale factor n may be chosen to be great enough to encompass most G2O poses 210 that are not false positives.

The computer 105 may be programmed to remove a G2O pose 210 from the second set upon determining that the G2O pose 210 is outside a spatial bound 225. For example, the computer 105 may remove the kth G2O pose 210 from the second set upon determining that the kth G2O pose 210 is outside the kth spatial bound 225, i.e., is outside the area circumscribed by $b_k$. The computer 105 may remove each G2O pose 210 that is outside the respective spatial bound 225 from the second set. The computer 105 may remove the G2O poses 210 that are outside the spatial bounds 225 from the second set before determining the final poses 405 (described below). Thus, the determination of the final poses 405 is performed using a second set that only includes the G2O poses 210 that are inside the respective spatial bounds 225.

With reference to FIG. 3, the computer 105 is programmed to remove a G2O pose 210 from the second set based on a comparison of a first change between two SLAM poses 205 and a second change between a previous G2O pose 210 and the G2O pose 210 of interest. The first and second changes may be between poses 205, 210 at corresponding timesteps, e.g., corresponding consecutive timesteps, e.g., from k−1 to k. In other words, the first change may be between the SLAM poses 205 at timesteps k−1 and k, and the second change may be between the G2O poses 210 at timesteps k−1 and k. Thus, changes from one SLAM pose 205 to the next SLAM pose 205 may set a limit on changes from one G2O pose 210 to the next G2O pose 210, and thereby exclude implausibly large changes from the second set of the G2O poses 210, which may indicate false positives.

The first and second changes may be rotations and/or translations. For example, the computer 105 may independently perform comparisons of first and second rotational changes, first and second translational changes along a first horizontal axis, and first and second translational changes along a second horizontal axis.

The comparison of the first and second rotational changes may be an azimuth angle between a first rotational change and a second rotational change, the first rotational change being a change in the rotation matrix of the SLAM poses 205 between consecutive timesteps, and the second rotational change being a change in the rotation matrix of the G2O poses 210 between consecutive timesteps, as in the following expression:

$$C_r = \{\check{R}_k : |\Theta(\check{R}_{k-1,k} \cdot R_{k-1,k}^T)| < th_\theta\}$$

in which $\mathcal{C}_r$ is the set of the rotation matrices $\check{R}_k$ from the second set of the G2O poses 210, $\check{R}_{k-1,k}$ is the change in the rotation matrix between the G2O poses 210 at k−1 and k, $R_{k-1,k}$ is the change in rotation matrix between the SLAM poses 205 at k−1 and k, the superscript T is the matrix transpose operator, and the is the rotational threshold.

The comparison of first and second translational changes may be a difference between a first translational change and a second translational change, the first translational change being a difference in translation vectors of the SLAM poses 205 between consecutive timesteps, and the second translational change being a difference in translation vectors of the G2O poses 210 between consecutive timesteps, as in the following expressions taken along a horizontal x-axis and a horizontal y-axis, respectively:

$$C_t = \{\check{t}_k : |[1\ \ 0\ \ 0] \cdot (\check{t}_{k-1,k} - t_{k-1,k})| < th_t\}$$

$$C_t = \{\check{t}_k : |[0\ \ 1\ \ 0] \cdot (\check{t}_{k-1,k} - t_{k-1,k})| < th_t\}$$

in which $\mathcal{C}_r$ is the set of the translation matrices $\check{t}_k$ from the second set of the G2O poses 210, $\check{t}_{k-1,k}$ is the change in translation matrix between the G2O poses 210 at k−1 and k, $t_{k-1,k}$ is the change in translation matrix between the SLAM poses 205 at k−1 and k, and $th_t$ is the translational threshold.

The computer 105 may remove the kth G2O pose 210 from the second set in response to any one of the preceding comparisons exceeding the respective threshold. The computer 105 may remove the G2O poses 210 with comparisons exceeding one of the thresholds before determining the final poses 405 (described below). Thus, the determination of the final poses 405 is performed using a second set that only includes the G2O poses 210 for which the comparisons are within the thresholds.

Figure 4:
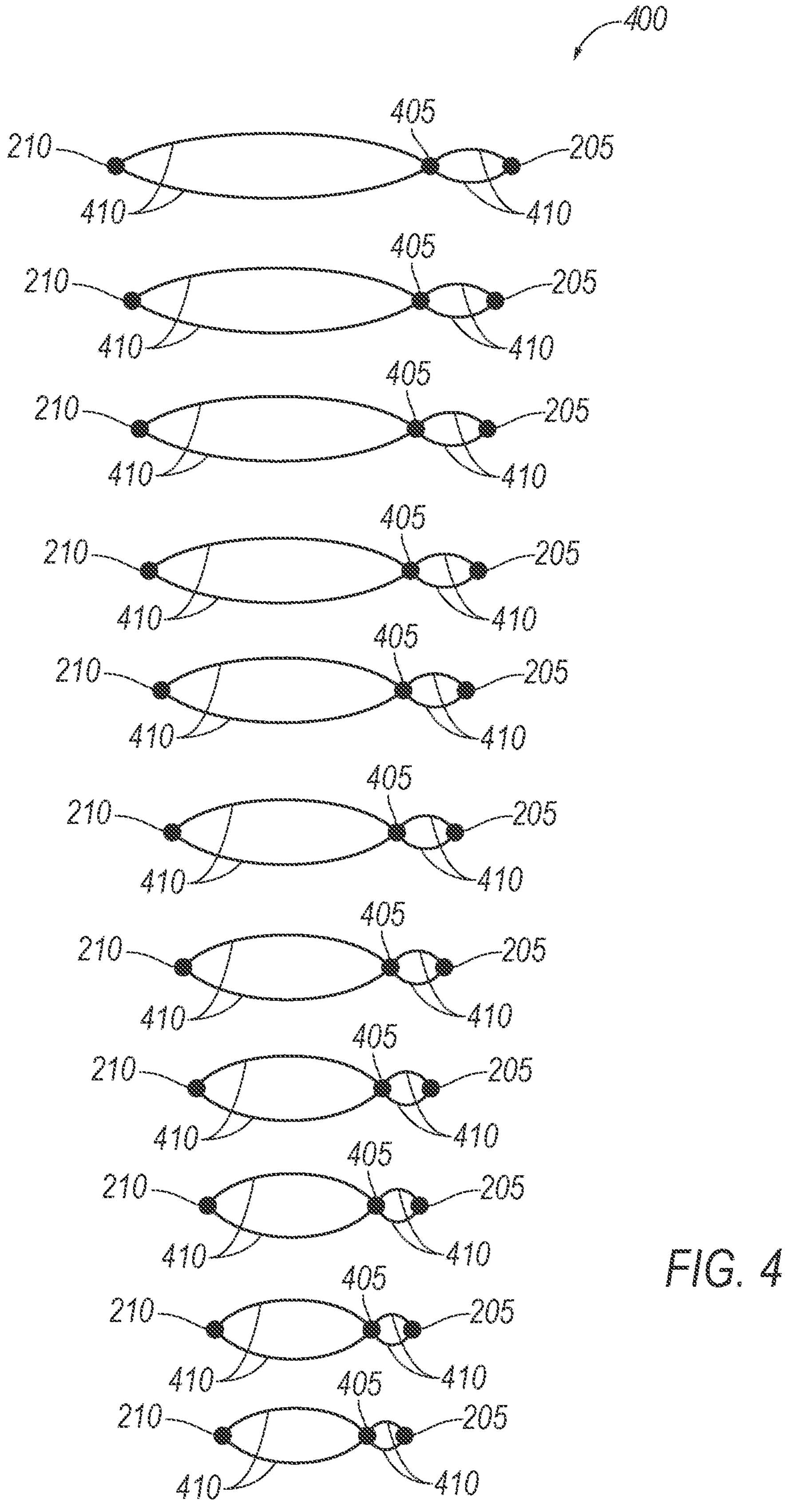
FIG. 4 is a diagram of an example pose graph.

With reference to FIG. 4, the determination of the final poses 405 (described below) is performed using a pose graph 400. The pose graph 400 represents the third set of the final poses 405, the first set of the SLAM poses 205, and the second set of the G2O poses 210 as a network graph. The pose graph 400 includes the final poses 405 as graph nodes and a plurality of error terms 410 as graph edges, i.e., connections between the graph nodes. The pose graph 400 may also include the SLAM poses 205 and/or the G2O poses 210 as graph nodes. An error term 410 connecting two poses 205, 210, 405 represents a relationship between the two poses 205, 210, 405, e.g., a final pose 405 should be close to the SLAM pose 205 from the same timestep.

The computer 105 is programmed to compute a loss function. The loss function is based on the SLAM poses 205 in the first set and the G2O poses 210 in the second set. For example, the loss function may include the error terms 410 defined by the pose graph 400, and the error terms 410 may be based on the SLAM poses 205 in the first set and/or the G2O poses 210 in the second set. The error terms 410 may penalize deviations between the final poses 405 in the third set and either the SLAM poses 205 in the first set or the G2O poses 210 in the second set, e.g., at least one error term 410 penalizing deviations between the final poses 405 in the third set and the SLAM poses 205 in the first set, and at least one error term 410 penalizing deviation between the final poses 405 in the third set and the G2O poses 210 in the second set. The error terms 410 may include separate terms penalizing rotational deviation and translational deviation, e.g., between the final poses 405 in the third set and the SLAM poses 205 in the first set, and between the final poses 405 in the third set and the G2O poses 210 in the second set. Each error term 410 may be, e.g., a summation of the deviations of interest over the first set of the SLAM poses 205 or over the second set of the G2O poses 210. The loss function may also include a term to minimize slack variables. For example, the loss function may be a summation of a first term penalizing rotational deviations between the final poses 405 in the third set and the SLAM poses 205 in the first set, a second term penalizing translational deviations between the final poses 405 in the third set and the SLAM poses 205 in the first set, a third term penalizing rotational deviations between the final poses 405 in the third set and the G2O poses 210 in the second set, a fourth term penalizing translational deviations between the final poses 405 in the third set and the G2O poses 210 in the second set, and a fifth term minimizing slack variables, as given by the following expression:

$$L = \sum_{\tilde{R}_{i,j} \in \tilde{\mathcal{V}}_r} \left\| \tilde{w}_{i,j} \left[ \log\left( \tilde{R}_{i,j} \cdot R_j^T \cdot R_i \right) \right]^{\vee} \right\|_{\tilde{\Sigma}_r}^2 + \sum_{\tilde{t}_{i,j} \in \tilde{\mathcal{V}}_t} \left\| \tilde{w}_{i,j} \left( \tilde{t}_{i,j} - s_j R_i^T (t_j - t_i) \right) \right\|_{\tilde{\Sigma}_t}^2 + \sum_{\check{R}_l \in \check{\mathcal{C}}_r} \left\| \left[ \log\left( R_l^T \cdot \tilde{R}_l \cdot \check{R}_l^T \right) \right]^{\vee} \right\|_{\check{\Sigma}_r}^2 + \sum_{\check{t}_l \in \check{\mathcal{C}}_t} \rho\left( \left\| \left( \check{t}_l - \tilde{R}_l^T (t_l - \tilde{t}_l) \right) \right\|_{\check{\Sigma}_t}^2 \right) + \sum_{k=1}^{K} \| s_k - s_{k-1} \|_{\sigma_s}^2$$

in which L is the value of the loss function, i, j, k, and l are indices of the timesteps, $\tilde{R}_{i,j}$ is a rotation matrix between the SLAM poses 205 at the timesteps i and j, $\tilde{\mathcal{V}}_r$ is the set of rotation matrices from the first set of SLAM poses 205, $\tilde{w}_{i,j}$ are visual odometry weights, log: SO(3)→SD(3) is the logarithm map, $[\ ]^V$ returns the vector elements from a skew-symmetric matrix, $R_i$ is a rotation matrix of the final pose 405 at the timestep i, $\tilde{t}_{i,j}$ is a translation matrix between the SLAM poses 205 at the timesteps i and j, $\tilde{\mathcal{V}}_t$ is the set of translation matrices from the first set of SLAM poses 205, $s_j$ is a slack variable for the timestep j, $\check{R}_l$ is a rotation matrix of the G2O pose 210 at the timestep l, $\check{\mathcal{C}}_r$ is the set of rotation matrices from the second set of the G2O poses 210, $\tilde{R}_l$ is a rotation matrix of the SLAM pose 205 at the timestep l, $\check{t}_l$ is a translation matrix of the G2O pose 210 at the timestep l, $\check{\mathcal{C}}_t$ is the set of translation matrices from the second set of the G2O poses 210, ρ is the Huber kernel (also called the Huber loss function), $t_l$ is the translation matrix of the final pose 405 at the timestep, l, $\tilde{t}_l$ is the translation matrix of the SLAM pose 205 at the timestep l, and K is the total number of timesteps. The visual odometry weights $\tilde{w}_{i,j}$ are weighted by a number of co-visible features in feature maps at the two timesteps, i.e., the number of features that are visible at the feature maps at both timesteps, e.g., $\tilde{w}_{i,j}=\sqrt{N_{i,j}}/\tilde{n}_{i,j}$ in which $N_{i,j}$ is the number of co-visible features between two timestamp i, j, and $\tilde{n}_{i,j}$ is a normalization factor. The Huber kernel is used because it is less sensitive to outliers than other functions such as squared error loss. The loss function uses hyperparameters to balance the terms: $\tilde{\Sigma}_r=\sigma_r I_3$, $\check{\Sigma}_t=\tilde{\sigma}_r I_3$, $\check{\Sigma}_r=\tilde{\sigma}_r I_3$, $$\check{\Sigma}_t = \mathrm{diag}(\check{\sigma}_t^x, \check{\sigma}_t^y, 0),$$

and $\sigma_s$, with σ indicating the standard deviation of the set of poses 205, 210 or slack variables indicated by the subscript and accent.

The computer 105 is programmed to determine the third set of the final poses 405 by minimizing the loss function, e.g., over the rotations and translations of the final poses 405 as well as possibly the slack variables, as indicated by the following expression:

$$\underset{\{\ldots, R_k, t_k, s_k, \ldots\}}{\mathrm{argmin}} \ L$$

The computer 105 may use any suitable algorithm for optimizing a pose graph 400, e.g., Gauss-Newton algorithm.

The computer 105 may iteratively perform the foregoing steps as the vehicle 100 operates in the environment. For example, the computer 105 may perform the foregoing steps to determine the final poses 405 at every timestep or every preset interval of timesteps. The preset interval of timesteps may be shorter than the number K of timesteps used for the determination of the final poses 405. The computer 105 may continue iteratively determining the final poses 405 for as long as the vehicle 100 is traveling through the environment, e.g., for as long as the vehicle 100 remains on.

The computer 105 may be programmed to actuate a component of the vehicle 100 based on the final poses 405 of the camera 110, e.g., based on the final pose 405 of the camera 110 at a most recent timestep. The computer 105 may determine a pose of the vehicle 100 based on the final pose 405 of the camera 110 at the most recent timestep according to a known, fixed geometric relationship between the camera 110 and a reference point of the vehicle 100. The component may include, e.g., the propulsion system 120, the brake system 125, and/or the steering system 130. For example, the computer 105 may actuate at least one of the propulsion system 120, the brake system 125, or the steering system 130. For example, the computer 105 may actuate the steering system 130 based on the distances to lane boundaries as part of a lane-centering feature, e.g., steering to assist the operator of the vehicle 100 from traveling too close to the lane boundaries. The computer 105 may identify the lane boundaries using the overhead image and/or the sensors 140 of the vehicle 100, including the camera 110. The computer 105 may, if the location of the vehicle 100 is within a distance threshold of one of the lane boundaries, instruct the steering system 130 to actuate to steer the vehicle 100 toward the center of the lane. For another example, the computer 105 may operate the vehicle 100, i.e., actuating the propulsion system 120, the brake system 125, and the steering system 130 based on the final poses 405, e.g., to navigate the vehicle 100 through the environment.

Figure 5:
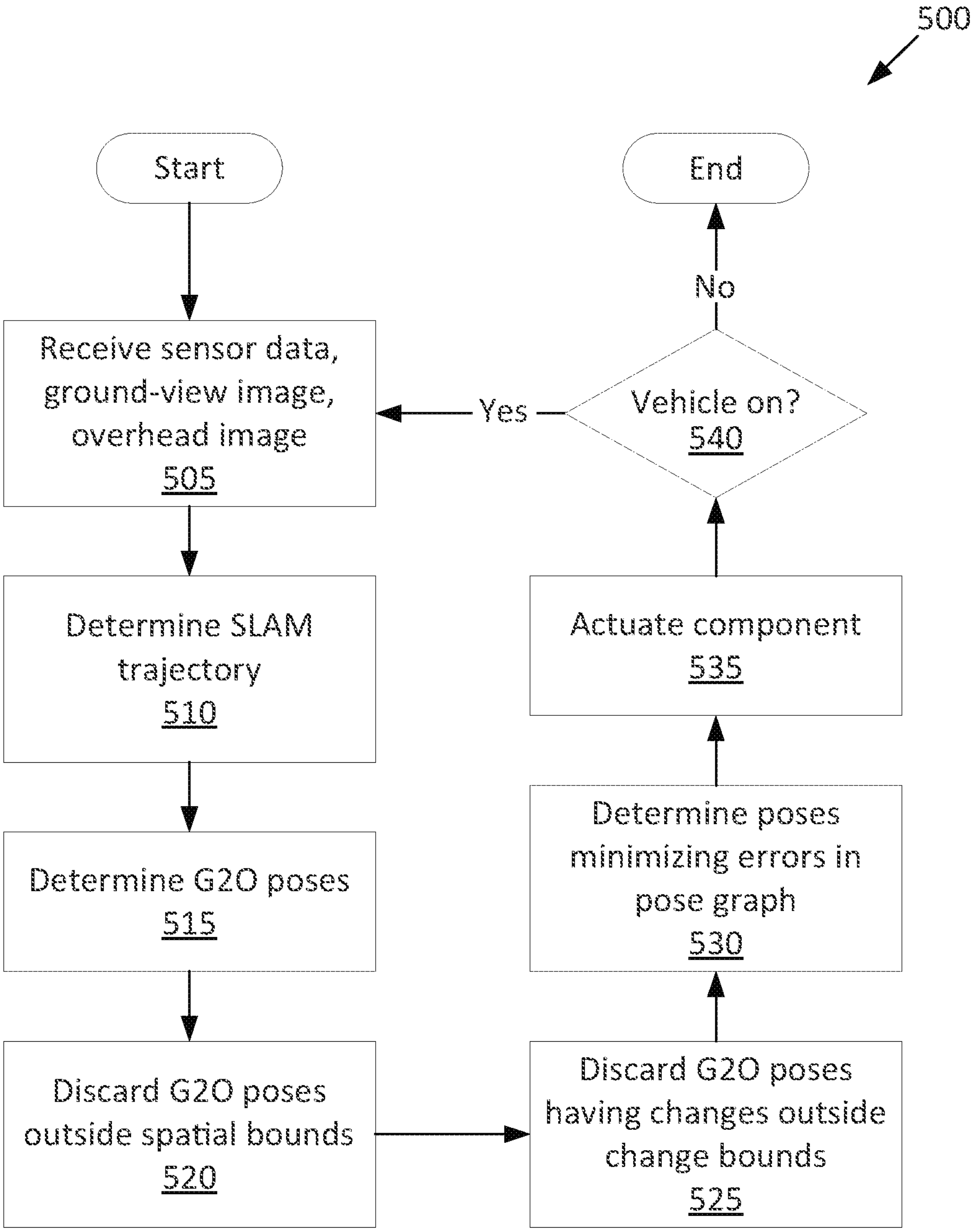
FIG. 5 is a flowchart of an example process for determining poses of the camera over time.

FIG. 5 is a flowchart illustrating an example process 500 for determining the final poses 405. The memory of the computer 105 stores executable instructions for performing the steps of the process 500 and/or programming can be implemented in structures such as mentioned above. As a general overview of the process 500, the computer 105 receives the images and data from the sensors 140, determines the first set of the SLAM poses 205, determines the second set of the G2O poses 210, removes the G2O poses 210 outside the spatial bounds 225 from the second set, removes the G2O poses 210 with comparisons outside the thresholds from the second set, determines the final poses 405, and actuates a component of the vehicle 100. The process 500 continues for as long as the vehicle 100 remains on.

The process 500 begins in a block 505, in which the computer 105 receives data from the sensors 140, the overhead image, and the ground-view image, as described above.

Next, in a block 510, the computer 105 determines the first set of the SLAM poses 205 based on the data from the sensors 140, as described above.

Next, in a block 515, the computer 105 determines the second set of the G2O poses 210, as described above.

Next, in a block 520, the computer 105 removes the G2O poses 210 from the second set that are outside the respective spatial bounds 225, as described above.

Next, in a block 525, the computer 105 removes the G2O poses 210 from the second set that have comparisons exceeding a threshold, each comparison being between a rotational or translation change from a previous G2O pose 210 to the G2O pose 210 of interest and a rotational or translation change between corresponding SLAM poses 205, as described above.

Next, in the block 530, the computer 105 determines the third set of the final poses 405 of the camera 110 by minimizing the loss function based on the first set of the SLAM poses 205 and the second set of the G2O poses 210 (as reduced in the blocks 520 and 525), as described above.

Next, in a block 535, the computer 105 actuates a component of the vehicle 100 based on the final poses 405, as described above.

Next, in a decision block 540, the computer 105 determines whether the vehicle 100 is still on. In response to the vehicle 100 still being on, the process 500 returns to the block 505 to continue monitoring the trajectory of the vehicle 100. In response to the vehicle 100 turning off, the process 500 ends.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, California), the AIX UNIX operating system distributed by International Business Machines of Armonk, New York, the Linux operating system, the Mac OSX and iOS operating systems distributed by Apple Inc. of Cupertino, California, the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer executable instructions may be compiled or interpreted from computer programs created using a variety of programming languages and/or technologies, including, without limitation, and either alone or in combination, Java™, C, C++, Matlab, Simulink, Stateflow, Visual Basic, Java Script, Python, Perl, HTML, etc. Some of these applications may be compiled and executed on a virtual machine, such as the Java Virtual Machine, the Dalvik virtual machine, or the like. In general, a processor (e.g., a microprocessor) receives instructions, e.g., from a memory, a computer readable medium, etc., and executes these instructions, thereby performing one or more processes, including one or more of the processes described herein. Such instructions and other data may be stored and transmitted using a variety of computer readable media. A file in a computing device is generally a collection of data stored on a computer readable medium, such as a storage medium, a random access memory, etc.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Instructions may be transmitted by one or more transmission media, including fiber optics, wires, wireless communication, including the internals that comprise a system bus coupled to a processor of a computer. Common forms of computer-readable media include, for example, RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), a nonrelational database (NoSQL), a graph database (GDB), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

In the drawings, the same reference numbers indicate the same elements. Further, some or all of these elements could be changed. With regard to the media, processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. Operations, systems, and methods described herein should always be implemented and/or performed in accordance with an applicable owner's/user's manual and/or safety guidelines.

The disclosure has been described in an illustrative manner, and it is to be understood that the terminology which has been used is intended to be in the nature of words of description rather than of limitation. The adjectives "first," "second," "third," etc. are used throughout this document as identifiers and are not intended to signify importance, order, or quantity. Use of "in response to," "upon determining," etc. indicates a causal relationship, not merely a temporal relationship. Many modifications and variations of the present disclosure are possible in light of the above teachings, and the disclosure may be practiced otherwise than as specifically described.

What is claimed is:

1. A computer comprising a processor and a memory, the memory storing instructions executable by the processor to:

determine a first set of SLAM poses of a camera with respect to an environment by performing a simultaneous localization and mapping (SLAM) algorithm;

determine a second set of G2O poses of the camera based on a plurality of ground-view images from the camera and an overhead image depicting the environment; and determine a third set of final poses of the camera by minimizing a loss function derived from a pose graph of the final poses, the pose graph including the final poses as graph nodes and a plurality of error terms as graph edges, the loss function based on the SLAM poses in the first set and the G2O poses in the second set, the loss function including the error terms, the error terms including at least one term penalizing deviation between the final poses in the third set and the SLAM poses in the first set.

2. The computer of claim 1, wherein the instructions further include instructions to actuate a component of a vehicle including the camera based on the final poses.

3. The computer of claim 1, wherein the instructions further include instructions to, before determining the third set of the final poses, remove a first G2O pose from the second set upon determining that the first G2O pose is outside a spatial bound.

4. The computer of claim 3, wherein the instructions further include instructions to determine the spatial bound based on the first set of the SLAM poses.

5. The computer of claim 3, wherein the instructions further include instructions to determine the spatial bound based on an uncertainty measure of the first set of the SLAM poses.

6. The computer of claim 1, wherein the first set includes a first SLAM pose at a first timestep and a second SLAM pose at a second timestep immediately following the first timestep;

the second set includes a first G2O pose at the first timestep and a second G2O pose at the second timestep; and the instructions further include instructions to, before determining the third set of the final poses, remove the second G2O pose from the second set based on a comparison of a first change from the first SLAM pose to the second SLAM pose and a second change from the first G2O pose to the second G2O pose.

7. The computer of claim 6, wherein the first change and the second change are rotations.

8. The computer of claim 6, wherein the first change and the second change are translations.

9. The computer of claim 6, wherein the instructions further include instructions to remove the second G2O pose from the second set in response to the comparison exceeding a threshold.

10. The computer of claim 1, wherein the error terms include separate terms penalizing rotational deviation between the final poses in the third set and the SLAM poses in the first set and penalizing translational deviation between the final poses in the third set and the SLAM poses in the first set.

11. The computer of claim 1, wherein the error terms include at least one term penalizing deviation between the final poses in the third set and the G2O poses in the second set.

12. The computer of claim 11, wherein the error terms include separate terms penalizing rotational deviation between the final poses in the third set and the G2O poses in the second set and penalizing translational deviation between the final poses in the third set and the G2O poses in the second set.

13. The computer of claim 1, wherein the SLAM poses, the G2O poses, and the final poses each include two spatial dimensions and one angular dimension.

14. A method comprising:

determining a first set of SLAM poses of a camera with respect to an environment by performing a simultaneous localization and mapping (SLAM) algorithm;

determining a second set of G2O poses of the camera based on a plurality of ground-view images from the camera and an overhead image depicting the environment; and determining a third set of final poses of the camera by minimizing a loss function derived from a pose graph of the final poses, the pose graph including the final poses as graph nodes and a plurality of error terms as graph edges, the loss function based on the SLAM poses in the first set and the G2O poses in the second set, the loss function including the error terms, the error terms including at least one term penalizing deviation between the final poses in the third set and the SLAM poses in the first set.

15. The method of claim 14, further comprising actuating a component of a vehicle including the camera based on the final poses.

16. The method of claim 14, further comprising, before determining the third set of the final poses, removing a first G2O pose from the second set upon determining that the first G2O pose is outside a spatial bound.

17. The method of claim 14, wherein the first set includes a first SLAM pose at a first timestep and a second SLAM pose at a second timestep immediately following the first timestep; and the second set includes a first G2O pose at the first timestep and a second G2O pose at the second timestep;

the method further comprising, before determining the third set of the final poses, removing the second G2O pose from the second set based on a comparison of a first change from the first SLAM pose to the second SLAM pose and a second change from the first G2O pose to the second G2O pose.

18. A computer comprising a processor and a memory, the memory storing instructions executable by the processor to:

determine a first set of SLAM poses of a camera with respect to an environment by performing a simultaneous localization and mapping (SLAM) algorithm;

determine a second set of G2O poses of the camera based on a plurality of ground-view images from the camera and an overhead image depicting the environment; and determine a third set of final poses of the camera by minimizing a loss function derived from a pose graph of the final poses, the pose graph including the final poses as graph nodes and a plurality of error terms as graph edges, the loss function based on the SLAM poses in the first set and the G2O poses in the second set, the loss function including the error terms, the error terms including at least one term penalizing deviation between the final poses in the third set and the G2O poses in the second set.

19. A computer comprising a processor and a memory, the memory storing instructions executable by the processor to:

determine a first set of SLAM poses of a camera with respect to an environment by performing a simultaneous localization and mapping (SLAM) algorithm;

determine a second set of G2O poses of the camera based on a plurality of ground-view images from the camera and an overhead image depicting the environment;

determine a spatial bound based on the first set of the SLAM poses;

before determining a third set of final poses of the camera, remove a first G2O pose from the second set upon determining that the first G2O pose is outside the spatial bound; and determine the third set of the final poses of the camera by minimizing a loss function derived from a pose graph of the final poses, the loss function based on the SLAM poses in the first set and the G2O poses in the second set.

20. A computer comprising a processor and a memory, the memory storing instructions executable by the processor to:

determine a first set of SLAM poses of a camera with respect to an environment by performing a simultaneous localization and mapping (SLAM) algorithm, the first set including a first SLAM pose at a first timestep and a second SLAM pose at a second timestep immediately following the first timestep;

determine a second set of G2O poses of the camera based on a plurality of ground-view images from the camera and an overhead image depicting the environment, the second set including a first G2O pose at the first timestep and a second G2O pose at the second timestep;

before determining a third set of final poses of the camera, remove the second G2O pose from the second set based on a comparison of a first change from the first SLAM pose to the second SLAM pose and a second change from the first G2O pose to the second G2O pose; and determine the third set of the final poses of the camera by minimizing a loss function derived from a pose graph of the final poses, the loss function based on the SLAM poses in the first set and the G2O poses in the second set.

* * * * *